Aug. 10, 1948.

H. S. DAVIS 2,446,870

AUTOMATIC SIGNALING MECHANISM FOR
AUTOMOBILES AND OTHER VEHICLES

Filed Oct. 2, 1945

INVENTOR
HENRY SPICER DAVIS
By Seymour, Earle & Nichols
ATTORNEYS

Aug. 10, 1948.  H. S. DAVIS  2,446,870
AUTOMATIC SIGNALING MECHANISM FOR
AUTOMOBILES AND OTHER VEHICLES
Filed Oct. 2, 1945  3 Sheets-Sheet 2
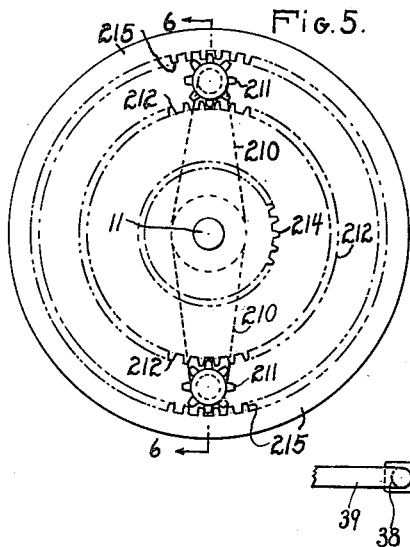
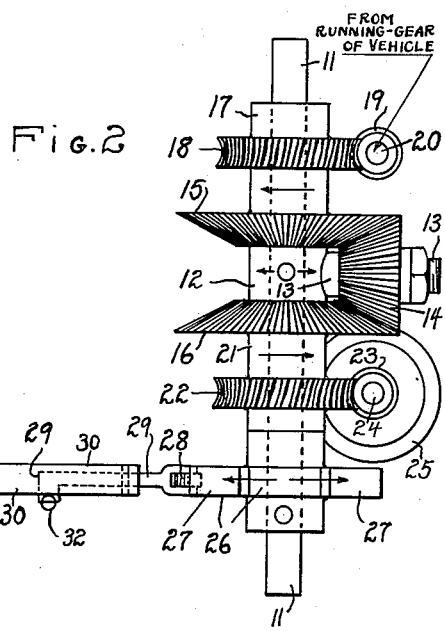
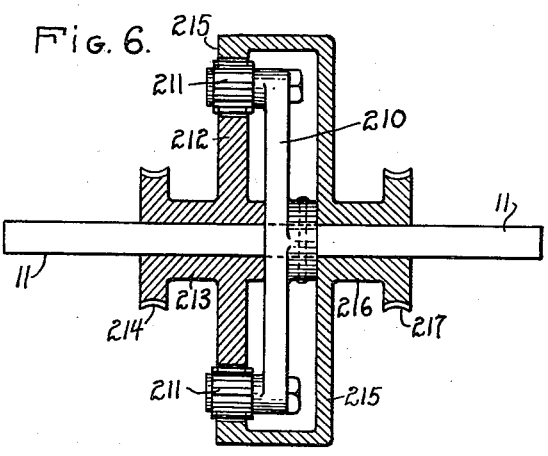
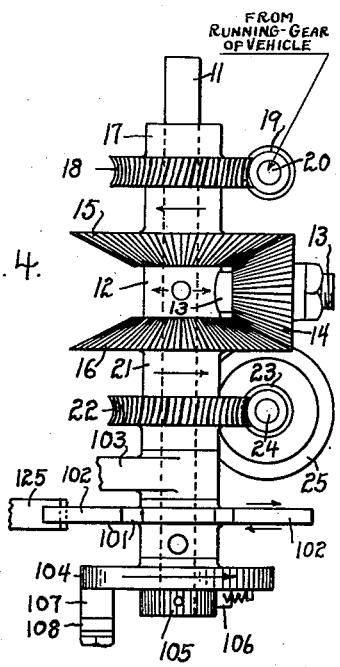
INVENTOR
HENRY SPICER DAVIS
BY
Seymour, Earle Nichols
ATTORNEYS

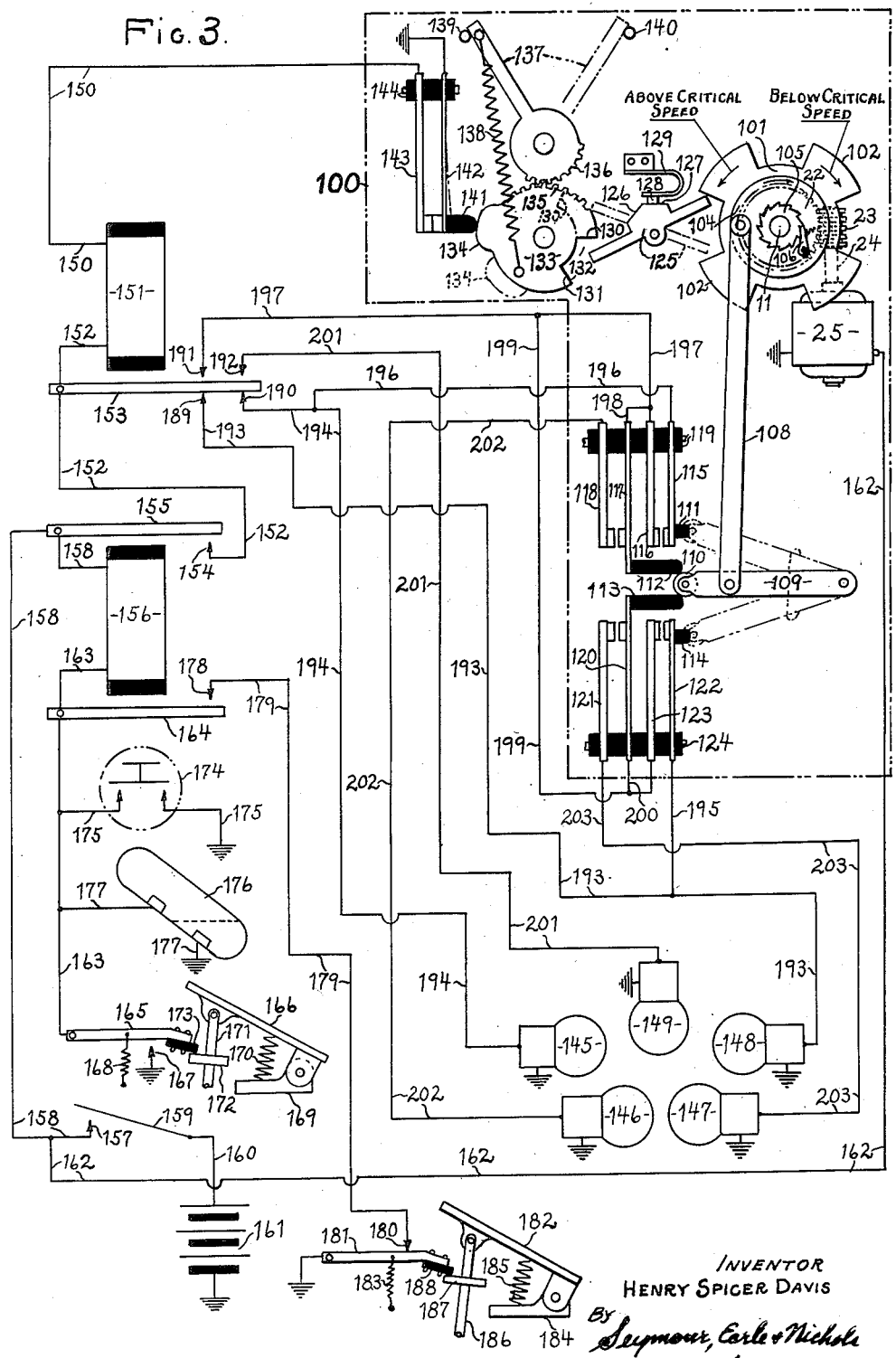

Patented Aug. 10, 1948

2,446,870

UNITED STATES PATENT OFFICE 2,446,870

AUTOMATIC SIGNALING MECHANISM FOR AUTOMOBILES AND OTHER VEHICLES

Henry Spicer Davis, West Haven, Conn.

Application October 2, 1945, Serial No. 619,739

14 Claims. (Cl. 177—311.5)

1

The present invention relates to improvements in signaling-mechanisms and relates more particularly to improvements in automatic signaling-mechanisms designed to control automatic signaling systems for automobiles and other vehicles.

The signaling-mechanism of the present invention constitutes improvements upon the mechanisms illustrated in my prior Patents Nos. 2,030,246, 2,072,246 and 2,118,775, respectively dated February 11, 1936, March 2, 1937, and May 24, 1938.

One of the objects of the present invention is to provide at a low cost for manufacture a superior, simple and reliable signaling-mechanism of the character referred to whereby the frequency of an intermittent electric signal may be increased as the speed of the vehicle decreases, to thereby indicate to observers a change of speed in a manner designed to more surely attract attention.

Another object of the present invention is to provide a simple, reliable and effective signaling-mechanism of the character referred to whereby the character of an electric signal may be automatically changed as the speed of a vehicle increases or decreases with respect to a predetermined or preselected speed.

A further object of the present invention is to provide a superior signal-mechanism for vehicle signals capable of discharging the dual function of increasing the frequency of an intermittent electric signal as the speed of the vehicle decreases, and of providing a definite change in the character of the signal when the speed of the vehicle changes to one below or above a predetermined or preselected speed.

Still another object of the present invention is to provide a superior signaling-mechanism of the character referred to which will require a minimum of power for its operation.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 2 is a top or plan view of a portion of the control-mechanism of Fig. 1;

2

Figure 1:
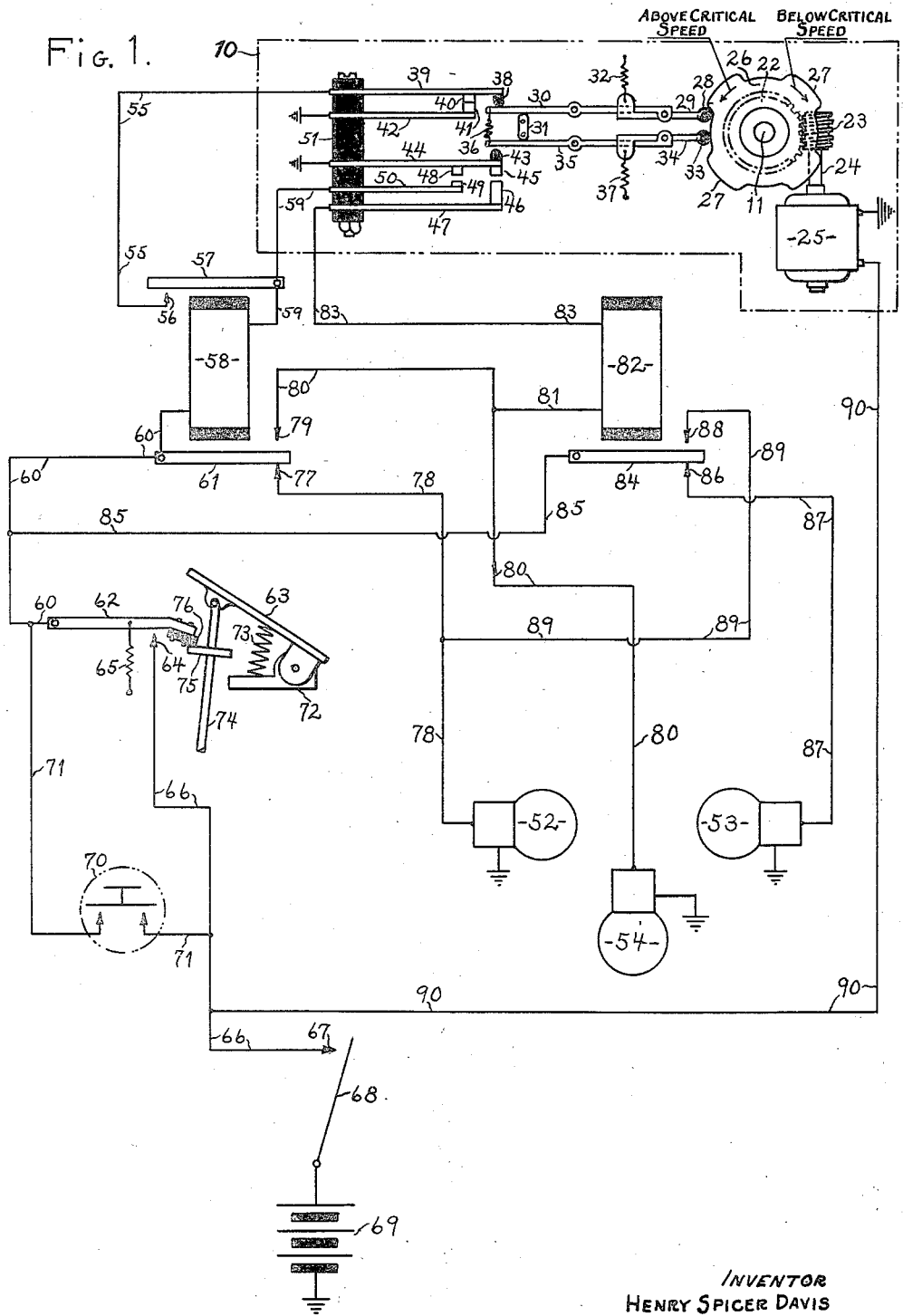
Fig. 1 is a schematic and diagrammatic illustration of one form of signaling system in which a control-mechanism embodying the present invention is included.

Fig. 3 is a view of the general nature of Fig. 1 but showing another form of signaling system and control-mechanism therefor;

Fig. 4 is a top or plan view of a portion of the control-mechanism of Fig. 3;

Fig. 5 is an end view of the control-shaft showing a planetary type of gear-assembly thereon; and Fig. 6 is a view partly in side elevation and partly in section on the line 6—6 of Fig. 5.

*The apparatus of Figs. 1 and 2*

The particular signaling system chosen for illustration in Figs. 1 and 2 for purposes of making clear one form of the present invention includes a control-mechanism designated as a whole by the reference character 10. The said control-mechanism includes a control-shaft 11 which may be supported for rotation in any suitable bearings (not shown). To the intermediate portion of the control-shaft 11 is rigidly secured gear-carrying means comprising a collar 12 from which radially-projects a stud 13. On the outer portion of the stud 13 a bevel driven-gear 14 is mounted with freedom for rotation which latter, in addition to having rotation about the stud 13, also has bodily movement therewith around the control-shaft 11 as a center, in a manner as will more fully hereinafter appear. The driven-gear 14 meshes at diametrically opposite points respectively into a bevel drive-gear 15 and a bevel drive-gear 16 respectively located on opposite sides of the collar 12 before referred to.

The drive-gear 15 above referred to forms a rigid feature of the inner end of a hub 17 which is mounted with freedom for rotation upon the adjacent portion of the control-shaft 11. The said hub 17 is also provided with a rigid worm-wheel 18 which is meshed into and driven by a worm 19 rigidly carried by a drive-shaft 20. The said drive-shaft 20 may be connected in any suitable manner to a running portion of an automobile or other vehicle in such manner that the speed of the said drive-shaft changes with the changes in the speed of the vehicle. A convenient point of an automobile structure to utilize to turn the drive-shaft 20 is the speedometer-drive forming a common feature of present-day automobiles.

The drive-gear 16 above referred to forms a rigid feature of the inner end of a hub 21 which, like the hub 17, before referred to, is mounted with freedom for rotation upon the control-shaft 11. Also like the hub 17, the hub 21 is provided with a rigid worm-wheel 22 which is meshed into and driven by a worm 23, as will be seen by reference to the upper portion of Fig. 1 and by reference to Fig. 2. The worm 23 forms a rigid feature of a drive-shaft 24 which in the instance shown is the shaft of an electric motor 25. The said electric motor is preferably of fractional horsepower of the shunt-wound type or other suitable type which will provide substantially constant speed.

As is indicated by arrows in Fig. 2, the electric motor 25 serves to turn the drive-gear 16 in a direction opposite to the direction in which the drive-gear 15 is driven from the drive-shaft 20 when the vehicle is moving forwardly, for purposes as will hereinafter appear.

Rigidly mounted upon the control-shaft 11 so as to rotate therewith is a control-cam 26 having four (more or less) cam-lugs 27 projecting radially from its periphery, as is indicated in Fig. 1.

Mounted in the path of movement of the cam-lug 27 of the control-cam 26 is a roller 28 mounted in the adjacent end of an actuating-lever 29 which is pivoted about midway of its length to the adjacent end of a switch-operating lever 30. The said switch-operating lever 30 is in turn mounted for pivotal movement intermediate its respective opposite ends, as is clearly illustrated in the upper portion of Fig. 1.

The turning movement of the lever 30 in a counterclockwise direction is limited by the engagement of the under face of its inner arm with a stop-member 31. A helical spring 32 is attached to the inner end of the actuating-lever 29 to yieldingly hold the inner arm of the said actuating-lever in engagement with the under face of the outer arm of the switch-operating lever 30. The said spring 32 also serves to yieldingly hold the inner arm of the switch-operating lever 30 in engagement with the stop-member 31.

For purposes as will hereinafter appear, the actuating-lever 29 is adapted to pivot in a counterclockwise direction with respect to the switch-operating lever 30, but to itself turn the said lever 30 in a clockwise direction when an effort is made by the cam-lugs 27 to turn the said actuating-lever 29 in a clockwise direction.

Located below the roller 28 and also adapted to be engaged by the cam-lugs 27 of the control-cam 26 is a roller 33 mounted in the adjacent end of an actuating-lever 34. The said actuating-lever 34 is pivotally connected intermediate its respective opposite ends to the outer ends of a switch-operating lever 35 which in turn is also pivoted intermediate its respective opposite ends.

The switch-operating lever 35, just above referred to, normally extends in substantial parallelism with the switch-operating lever 30 before described and has its inner end connected thereto by a helical spring 36 as is indicated in the upper portion of Fig. 1. Attached to the inner arm of the actuating-lever 34 is a helical spring 37 which serves to yieldingly hold the actuating-lever 34 against clockwise turning movement with respect to the switch-operating lever 35 as well as serving to maintain the inner arm of the said lever 35 in engagement with the under portion of the stop-member 31.

The actuating-lever 34 above referred to will serve to positively turn the switch-operating lever 35 in a counterclockwise direction when the cam-lugs 27 of the control-cam 26 tend to move the roller 33 upwardly. On the other hand when the said cam-lugs 27 tend to move the roller 33 downwardly the actuating-lever 34 will swing against the tension of the spring 37 without moving the switch-operating lever 35.

The inner arm of the switch-operating lever 30 is engaged by a block of insulation 38 depending from the outer end of a flexible switch-arm 39. The switch-arm 39 is provided with a depending-contact 40 which is normally engaged with a contact 41 upwardly projecting from the free end of a flexible switch-arm 42.

The inner arm of the switch-operating lever 35 is adapted on occasion to engage the upper end of a block of insulation 43 projecting upwardly from the right end of a flexible switch-arm 44. Depending from the free right end of the switch-arm 44 is a contact 45 which is adapted to engage with a contact 46 projecting upwardly from the adjacent end of a flexible switch-arm 47. Inwardly from its free end, the switch-arm 44 is provided with a contact 48 depending therefrom and adapted on occasion to engage with a complemental contact 49 projecting upwardly from the adjacent end of a flexible switch-arm 50. The flexible switch-arms 39, 42, 44, 47 and 50 extend in parallelism with each other and have their left ends spaced and insulated from each other by suitable insulation indicated by the reference character 51.

The control-mechanism 10 which has been described above, is adapted to control the energization of three signal-lamps respectively designated by the reference characters 52, 53 and 54 or other suitable electric signals, in a manner as will hereinafter appear. The said signal-lamps are preferably mounted at the exterior rear of the vehicle in position to be readily observed by extraneous observers.

The switch-arm 39 of the control-mechanism 10 is connected by means of a wire 55 to a contact 56 which is adapted to be engaged by an armature 57 mounted adjacent one end of an electromagnet 58. One terminal of the said electromagnet, as well as the armature 57, is connected by means of a wire 59 to the switch-arm 50 of the control-mechanism 10.

The remaining terminal of the electromagnet 58 above referred to is connected by means of a wire 60 to an armature 61 located adjacent the lower end of the said electromagnet 58, and to a pivotal switch-arm 62 mounted adjacent the brake-pedal 63 of an automobile or other vehicle.

The switch-arm 62 is urged to swing downwardly into engagement with a contact 64 by means of a spring 65. The contact 64 with which the switch-arm 62 is adapted to engage is connected by means of a wire 66 to a contact 67 which is adapted to be engaged by a pivotal switch-blade 68 which, in turn, is connected to one terminal of a storage battery 69 or other suitable source of electrical energy. The switch elements 67 and 68 constitute what might be aptly termed a "master switch," since the said elements control the flow of current to the entire signaling system, and the switch-blade 68 is preferably situated in the automobile or other suitable vehicle, in position to be readily manually manipulated by the operator of the vehicle.

To enable the operator of the vehicle to manually energize the signaling-system independently of the electrical circuit through the switch-arm 62 and its complemental contact 64, a pushbutton switch 70 is interposed in a wire 71 leading from the wire 66 to the wire 60, as is indicated in Fig. 1.

Returning now to the brake-pedal 63, the said brake-pedal is pivotally mounted at its lower end upon a bracket 72 and is yieldingly urged to turn in a direction required to elevate its free end by means of a helical compression-spring 73, as is indicated in Fig. 1.

Pivotally connected to the brake-pedal 63 adjacent the free end thereof is a brake-operating plunger 74 which is provided with a collar 75 adapted to engage a block of insulation 76 mounted on the underside of the free end of the switch-arm 62 before described.

When the brake-pedal 63 is relieved of foot pressure, the spring 73 thereof is of sufficient strength to cause the collar 75 of the brake-operating plunger 74 to elevate the free end of the switch-arm 62 against the tension of the spring 65.

Returning now to the armature 61 adjacent the lower end of the electromagnet 58, it will be noted by reference to Fig. 1 that when the said electromagnet is not energized, the free end of the said armature 61 rests upon a contact 77 which is connected by means of a wire 78 to the signal-lamp 52 before referred to. Mounted above the contact 77 and adjacent the free end of the armature 61, is a contact 79 connected by means of a wire 80 to one terminal of the signal-lamp 54 before referred to.

Connected into the wire 80 just above referred to, is a wire 81 leading to one terminal of an electromagnet 82. The remaining terminal of the said electromagnet is connected by means of a wire 83 to the switch-arm 47 of the control-mechanism 10. Located adjacent the lower end of the electromagnet 82 is a pivotal armature 84 having its pivoted end connected by means of a wire 85 to the wire 60 leading from the switch-arm 62 located adjacent the brake-pedal 63. The free end of the armature 84 rests upon a contact 86 when the electromagnet 82 is unenergized. The said contact 86 is connected by means of a wire 87 to one terminal of the signal-lamp 53 before referred to.

Spaced above the contact 86 in position to be engaged by the armature 84 when the same is raised by the electromagnet 82, is a contact 88 connected by means of a wire 89 to the wire 78 extending between the signal-lamp 52 and the contact 77.

Extending from one terminal of the electric motor 25 of the control-mechanism 10 is a wire 90 having its opposite end connected into the wire 66 so as to be under the control of the master-switch comprising the elements 67 and 68.

*Operation*

Before proceeding with a description of the details of operation of the signaling-system illustrated in Figs. 1 and 2, brief mention may be made of the signal-indications produced by the novel control-mechanism with which the present invention mainly is concerned.

The control-mechanism 10 will under certain conditions, effect the steady energization of the signal-lamps 52 and 53, while on other occasions the signal-lamp 54 will receive steady energization in conjunction with the pulsating or intermittent alternate energization of the signal-lamps 52 and 53 at frequencies which vary inversely with respect to the forward speed of the vehicle. In other words, the rate of energization-impulses to the signal-lamps 52 and 53 increases progressively with the progressive decrease in the speed of the vehicle and vice versa.

For purposes of making clear the operation of the signaling-system illustrated in Figs. 1 and 2, it may be assumed that the switch-blade 68 has previously been manually moved into engagement with the contact 67 and that the vehicle is moving forwardly at a rate of 55 miles per hour, for instance.

It may further be assumed that the constant-speed electric motor 25 is designed to turn the drive-gear 16 at the same speed (though in an opposite direction) that the drive-gear 15 would be driven by the vehicle, were the vehicle moving forwardly at the predetermined critical rate of 45 miles per hour. Obviously, any other desired critical speed other than 45 miles per hour may be selected, but the said speed will serve for purposes of illustration.

Under the conditions above referred to, the drive-gear 15 will be driven by the vehicle in the direction indicated by the arrow in Fig. 2, at a greater rate of speed than the electric motor 25 is turning the drive-gear 16 in the opposite direction. Therefore, the driven-pinion 14 will actually bodily move in the same direction as the drive-gear 15 and will correspondingly turn gear-carrying means (comprising the collar 12 and stud 13) and the control-shaft 11.

Now since the control-cam 26 is rigidly mounted upon the control-shaft 11, the said control-cam will turn in the same direction as the drive-gear 15 and in a counterclockwise direction as viewed in Fig. 1. It is to be understood, however, that the speed of rotation of the control-shaft 11 and control-cam 26 will only be actually at one-half the rate of speed of the turning of the drive-gear 15 relative to the drive-gear 16.

As the control-cam 26 turns, as just above described, its cam-lugs 27 will sequentially engage with the roller 28 of the actuating-lever 29 and swing the said actuating-lever downwardly as viewed in Fig. 1. This downward swinging movement will swing the switch-operating lever 30 in a clockwise direction against the tension of the spring 32 and the spring 36 to flex the switch-arm 39 upwardly and thus disengage the contact 40 from the contact 41. Due to the fact however that the switch-arm 62 is at this time out of engagement with the contact 64, no energization of any of the signal-lamps 52, 53 or 54 will occur.

It is well to here note that as the actuating-lever 29 is being rocked, as above described, by the cam-lugs 27 the said cam-lugs are also engaging with the roller 33 of the actuating-lever 34 to rock the said actuating-lever in a clockwise direction. This rocking movement of the said actuating-lever 34 will however not serve to move the switch-operating lever 35, due to the one-way action of the actuating-lever 34.

Let it now be assumed that the operator of the vehicle depresses the brake-pedal 63 to thereby permit the switch-arm 62 to engage with the contact 64. This engagement will, through the circuit illustrated in Fig. 1 serve to steadily energize both of the signal-lamps 52 and 53 and leave the signal-lamp 54 unenergized.

Now as the vehicle slows up by virtue of the application of the brakes by means of the brake-pedal 63, as above described, the signal-lamps 52 and 53 will remain steadily lighted until the speed of the vehicle falls slightly below the predetermined critical speed of 45 M. P. H.

As soon as the vehicle speed falls slightly below the predetermined critical speed just above referred to, the drive-gear 16 will be turning at a speed greater than the speed of the vehicle-driven drive-gear 15, with the result that the driven-gear 14 will bodily move in the same direction as the said drive-gear 16. The bodily-movement of the driven-gear 14 that was just referred to will cause the control-shaft 11 to turn in a clockwise direction and hence will cause the control-cam 26 to similarly turn.

The clockwise turning movement of the control-cam 26 will cause the cam-lugs 27 thereof to sequentially rock the switch-operating lever 35 in a counterclockwise direction to thus cause the inner end of the said lever to downwardly flex the switch-arm 44. The described downward flexing of the switch-arm 44 will engage the contact 48 with the contact 49 and simultaneously engage the contact 45 with the contact 46. The engagement of the contact 48 with the contact 49 will energize the electromagnet 58, thus causing the same to pull both of its armatures 57 and 61 toward it.

The attraction of the armature 57 as above described will engage the said armature with the contact 56 and thus complete a circuit through the elements 39, 40, 41 and 42 of the control-mechanism, to thereby maintain the said electromagnet 58 energized despite the fact that the contacts 48 and 49 are being intermittently opened as the control-cam 26 rotates. Thus, in effect, the elements 56, 57 and 58 provide a locking-relay.

At the same time that the armature 57 engages with a contact 56, the complementary armature 61 of the electromagnet 58 will be swung up into engagement with the contact 79, thereby simultaneously supplying current to the signal-lamp 54 for the steady energization thereof and for energizing the electromagnet 82.

The described energization of the electromagnet 82 will lift the armature 84 into engagement with the contact 86 and thereby continue the flow of current to the signal-lamp 52. The described upward movement of the armature 84 will break the circuit to the signal-lamp 53.

As the control-cam 26 continues to rotate, the switch-operating lever 35 will swing in opposite directions as the cam-lugs 27 engage and move past the roller 33, so that the electromagnet 82 will be intermittently energized. This will cause the armature 84 to alternately engage the contacts 86 and 88 to thereby alternately flash the signal-lamps 52 and 53 at a relatively slow rate due to the fact that the vehicle has fallen in speed but a slight amount below the critical speed of 45 M. P. H. referred to. During this alternate energization of the signal-lamps 52 and 53, it will be realized that the armature 57 has caused the electromagnet 58 to remain energized, thus holding the complementary armature 61 in engagement with the contact 79 as is required to maintain the steady energization of the signal-lamp 54 and the ability of the electromagnet 82 to respond to the opening and closing of the contacts 45 and 46.

Now as the vehicle further slows down below the preselected critical speed of 45 M. P. H., the control-cam 26 will turn proportionately faster (due to the increased difference in speed between the drive-gears 15 and 16) with the effect of causing the rate of alternate energization of the signal-lamps 52 and 53 to occur at an increasingly greater rate of speed as the speed of the vehicle decreases.

Now as the vehicle is brought to a stop, the drive-gear 15 will also come to a stop, while the complementary drive-gear 16 continues to rotate at its predetermined constant speed under the drive of the electric motor 25. Thus the drive-gear 16 will be rotating rapidly relative to the now-stationary drive-gear 15, with the result that the driven-gear 14 will bodily move around the control-shaft 11 at a relatively rapid rate (one-half the speed of the drive-gear 16) and thus similarly rotate the control-shaft 11 and control-cam 26 to continue to cause the alternate energization of the signal-lamps 52 and 53 at a near-maximum frequency. This frequency will be exceeded only when the vehicle is moving in reverse, as will be presently described. It is to be noted that when the vehicle is at rest the signal-lamp 54 continues to be steadily energized, as has been the case as the speed has decreased from approximately 45 M. P. H.

Now when the vehicle is moving in reverse, the vehicle-driven drive-gear 15 will be turned in the same direction as the direction in which the drive-gear 16 is being driven by the electric motor 25. This will cause the even more rapid bodily movement of the driven-gear 14, with a corresponding increase in speed of the control-shaft 11 and the control-cam 26.

This high speed of the control-cam 26 will cause the signal-lamps 52 and 53 to be alternately energized at a relatively very rapid rate while the signal-lamp 54 remains steadily energized. Now since under the conditions described when the car is being moved in reverse, the brake-pedal 63 will not be depressed, it will be necessary to close the pushbutton switch 70 in order to provide a path for the flow of current from the storage-battery 69 to the wire 60.

Now let it be assumed that the operator of the vehicle desires to have the vehicle start from "rest" and move forwardly, under which conditions, of course, the brake-pedal 63 will not be ordinarily depressed. Under these conditions, the operation of the control-mechanism 10 will not effect any energization of the signal-lamps 52, 53 or 54, inasmuch as the switch-arm 62 is at this time out of engagement with the contact 64.

If, however, during the start-up and acceleration of the vehicle, weather or other conditions should make it desirable to attract the attention of extraneous observers such as following drivers, the operator of the vehicle may close the pushbutton switch 70 in lieu of depressing the brake-pedal 63, to thereby supply current to the control-mechanism 10.

Under the conditions just last described with the pushbutton switch 70 closed, the signal-lamps 52 and 53 will be alternately energized at a progressively decreasing rate as the speed of the vehicle increases, while the signal-lamp 54 will remain steadily energized.

As soon as conditions warrant, the operator of the vehicle may release the pushbutton switch 70 thereby stopping the described action of the signal-lamps 52, 53 or 54 which will not resume such action until such time as the operator depresses the brake-pedal 63 or again closes the pushbutton switch 70.

Let it be assumed that the vehicle is moving forwardly at a speed slightly below the critical speed of 45 miles per hour on a down grade and that the operator depresses the brake-pedal and that the vehicle, however, continues to accelerate. Under the conditions just referred to, the depression of the brake-pedal 63 will cause a supply of current to flow to the control-mechanism 10, while the control-cam 26 rotates in a clockwise direction as viewed in Fig. 1. This rotation of the control-cam will continue to cause the switch-operating lever 35 to rock and flex the switch-arm 44 to cause the steady energization of the signal-lamp 54 and the alternate energization of the signal-lamps 52 and 53 in the manner previously described.

Now as the forward speed of the vehicle passes above the critical speed of 45 miles per hour, the control-cam 26 will turn in a counterclockwise direction as viewed in Fig. 1, with the result that the switch-operating lever 35 will no longer flex the switch-arm 44, but the switch-operating lever 30 will come into action to flex the switch-arm 39. The flexing of the switch-arm 39 will alternately disengage and re-engage the contact 40 with the contact 41 at a rate progressively increasing with the increasing speed of the vehicle. The first disengagement of the contact 40 from the contact 41 will de-energize the electromagnet 58, thereby releasing the armature 57. The de-energization of the electromagnet 58 also releases the armature 61, thereby permitting the same to re-engage with the contact 77, thereby causing a steady supply of current to flow to both the signal-lamps 52 and 53, while depriving the signal-lamp 54 of current. The subsequent re-engagement of the contact 40 with the contact 41 will have no effect upon the signal-lamps 52, 53 or 54, which latter will continue in the condition last described until the speed of the vehicle again falls below the critical speed of 45 miles per hour.

The apparatus of Figs. 3 and 4

The signaling system illustrated in Figs. 3 and 4 includes a control-mechanism generally designated by the reference character 100 and which includes a control-shaft 11 and related elements corresponding to those described in connection with the signaling system of Figs. 1 and 2 and respectively numbered from 11 to 25, inclusive.

In the structure of Figs. 3 and 4 however, the control-cam 26 is omitted and replaced by a control-cam 101 having four (more or less) cam-lugs 102 projecting radially therefrom. Located outwardly with respect to the control-cam 101 is a bearing 103, an eccentric-operating disc 104 and a ratchet-wheel 105.

The ratchet-wheel 105 above referred to, is rigidly attached to the adjacent end of the control-shaft 11 and is engaged by a pawl 106 which is pivotally mounted on the outer face of the disc 104. The said disc 104 is so mounted upon the control-shaft 11 as to permit the latter to turn therein. Thus the control-shaft 11, through the intermediary of the ratchet-wheel 105 and pawl 106, will turn the eccentric-operating disc 104 in a clockwise direction when the said control-shaft 11 is turned in a clockwise direction. When the control-shaft 11 turns in a counterclockwise direction, however, the teeth of the ratchet-wheel 105 will idly ride beneath the pawl 106 without effecting a similar rotation of the disc 104.

Adjacent its periphery the eccentric-operating disc 104 carries an eccentric stud 107 projecting in parallelism with the control-shaft 11 and having the upper end of a link 108 pivoted to it. The lower end of the said link 108 is pivotally connected to a contact-actuating lever 109 carrying a roller 110 at its free or swinging end. The said roller 110 is adapted to sequentially engage and retire a series of lugs 111, 112, 113 and 114 formed of insulating material, in a manner as will hereinafter appear.

The lug 111 is carried by a flexible switch-arm 115 which is adapted to be flexed into electrical engagement with an adjacent and parallel switch-arm 116. The lug 112 is mounted at the outer end of a flexible switch-arm 117 which is adapted to be flexed into electrical engagement with a switch-arm 118 extending parallel therewith. The switch-arms 115, 116, 117 and 118 extend in parallelism with each other and are held in spaced relationship and insulated from each other by a body of insulation generally designated by the reference character 119.

The lug 113 is mounted upon the outer end of a flexible switch-arm 120 which is adapted to be flexed into electrical engagement with an adjacent switch-arm 121. The lug 114 is in turn mounted on the free end of a flexible switch-arm 122 which is adapted to be flexed into engagement with an adjacent switch-arm 123. The switch-arms 120 to 123, inclusive, are held in spaced parallel relationship and insulated from each other by a body of insulation generally designated by the reference character 124.

Mounted in the path of movement of the cam-lugs 102 of the control-cam 101 is the inner end of an actuating-lever 125 pivoted substantially midway between its respective opposite ends. The said actuating-lever 125 is provided with two angularly disposed detent-surfaces 126 and 127 adapted to alternately engage with a detent-lug 128 mounted on a U-shaped detent-spring 129, as is clearly shown in Fig. 3.

The end of the actuating-lever 125 remote from the control-cam 101 is adapted to alternately engage with the substantially-radial opposite walls 130 and 131 of a clearance-notch 132 formed in the periphery of an oscillating contact-operating plate 133. The said plate 133 is formed with a radially projecting lug 134 and with an arcuate series of gear-teeth 135 formed upon the upper portion of its periphery. The said teeth 135 are meshed into by similar teeth 136 formed upon the periphery of the lower portion of a detent-lever 137 pivotally mounted adjacent the contact-operating plate 133 and projecting away from the same.

Yieldingly interconnecting the upper portion of the detent-lever 137 with a lower portion of the contact-operating plate 133 is a helical detent-spring 138. The swinging movement of the detent-lever 137 and hence also the swinging movement of the contact-operating plate 133 is limited by two spaced-apart stop-abutments 139 and 140 located adjacent the relatively slender upper portion of the said detent-lever 137 as is shown in Fig. 3.

The lug 134 projecting from the periphery on the oscillating contact-operating plate 133 is adapted to engage with and disengage from a lug 141 carried at the lower end of a flexible switch-arm 142 which is adapted to be flexed into electrical engagement with a parallel switch-arm 143. The said switch-arms 142 and 143 are held in spaced relationship and insulated from each other by a body of insulation generally designated by the reference character 144.

The control-mechanism 100 which has been above described is adapted to control the energization of five signal-lamps, respectively designated by the reference characters 145 to 149 inclusive, or other suitable electric signals in a manner as will hereinafter appear. The said signal-lamps are preferably mounted upon the exterior of the rear of a vehicle.

The switch-arm 143 of the control-mechanism 100 is connected by means of a wire 150 to an electromagnet 151. The remaining terminal of the electromagnet 151 is connected by means of a wire 152 to an armature 153 and a contact 154. The said armature 153 is located adjacent the lower end of the electromagnet 151 so as to be swung upwardly thereby while the contact 154 is located adjacent the free end of an armature 155.

The said armature 155 is located adjacent the upper end of an electromagnet 156 which has one of its terminals connected to the armature 155 and to a contact 157 by means of a wire 158. The contact 157 is adapted to be engaged by a pivotal switch-blade 159 and constituting together therewith what may be aptly termed a "master switch."

The switch-blade 159 is connected by means of a wire 160 to one terminal of a storage-battery 161 or other suitable source of electrical energy. Connected into the wire 158 so as to receive a supply of current coincidentally with the engagement of the switch-blade 159 with the contact 157 is a wire 162 leading to one terminal of the electric motor 25 of the control-mechanism 100 before referred to.

As above described, one terminal of the electromagnet 156 is connected to the wire 158. The remaining terminal of the electromagnet 156 is connected by means of a wire 163 to a locking-armature 164 and a pivotal switch-arm 165. The armature 164 is located adjacent the lower end of the electromagnet 156 in position to be attracted thereby while the switch-arm 165 is located adjacent a brake-pedal 166 of an automobile or other vehicle.

The switch-arm 165 is urged to swing downwardly into engagement with a contact 167 by means of a helical spring 168. The brake-pedal 166 is pivotally mounted at its lower end upon a bracket 169 and is yieldingly urged to swing upwardly by a helical compression-spring 170, as is indicated in Fig. 3.

Pivotally connected to the brake-pedal 166 adjacent the free end thereof, is a brake-operating plunger 171 provided with a collar 172 which is adapted to engage a block of insulation 173 mounted on the underside of the free end of the switch-arm 165 before described.

When the brake-pedal 166 is relieved of foot pressure, the spring 170 is of sufficient strength to cause the collar 172 of the brake-operating plunger 171 to elevate the free end of the switch-arm 165 and thus disengage the free end of the same from the contact 167.

To enable the operator of the vehicle to manually energize the system independently of the electric circuit through the switch-arm 165 and contact 167, a push-button switch 174 is interposed in a wire 175 leading from the wire 163 to ground.

To render the signaling system operative independently of the operation of the brake-pedal 166 or of the pushbutton switch 174, a so-called "mercury switch" 176 may be employed, as shown in Fig. 3. The said mercury switch is interposed in a wire 177 leading from the wire 163 to ground. Preferably, the said mercury switch 176 or its equivalent is inclined so that when the vehicle is rapidly decelerated, the said switch 176 will close the circuit.

For the purpose of maintaining the electromagnet 156 in an energized condition until the accelerator of the car is operated, and once the said electromagnet has been energized by the operation of the brake-pedal 166, the mercury switch 176 or the pushbutton switch 174, the locking-armature 164 is caused by the said electromagnet 156 to engage with a contact 178 to effect an accelerator-controlled locking-circuit, as will be presently described. The purpose of the action just referred to is to insure that once the signaling system has been placed in operation while the accelerator remains idle, the signaling system will remain energized until such time as the accelerator is depressed.

The contact 178 is connected by means of a wire 179 to a contact 180 which is adapted to be engaged by a pivotal switch-arm 181 when the latter is in its elevated position. The said switch-arm 181 is mounted adjacent an accelerator-pedal 182 of the automobile or other vehicle, and is urged to swing downwardly out of engagement with the contact 180 by means of a helical spring 183.

The accelerator-pedal 182 is pivotally mounted at its lower end upon a bracket 184 and is yieldingly urged in a direction required to elevate its free end, by means of a helical compression-spring 185.

Pivotally connected to the accelerator-pedal 182 is the upper end of a throttle-plunger 186 provided with a collar 187 which is adapted to engage a block of insulation 188 mounted on the underside of the free end of the switch-arm 181 before described.

When the accelerator-pedal 182 is relieved of foot pressure, the spring 185 is of sufficient strength to cause the collar 187 of the throttle-plunger 186 to elevate the free end of the switch-arm 181 into engagement with the contact 180 and against the tension of the spring 183.

Returning now to the armature 153 of the electromagnet 151, it will be noted by reference to Fig. 3 that when the said electromagnet 151 is not energized, the said armature 153 is adapted to simultaneously engage with two contacts 189 and 190. On the other hand, when the electromagnet 151 is energized so as to swing the armature 153 upwardly, the said armature is adapted to simultaneously engage two contacts respectively designated by the reference characters 191 and 192.

The contact 189 above referred to is connected by means of a wire 193 to the signal-lamp 148. The companion contact 190 is connected by means of a wire 194 to the signal-lamp 145. Connected into the wire 193 is a wire 195 extending to the flexible switch-arm 122. Similarly connected into the wire 194 is a wire 196 leading to the flexible switch-arm 115.

The contact 191 adjacent the armature 153 is connected by means of a wire 197 to the switch-arm 116. Connected into the wire 197 and extending to the flexible switch-arm 117 is a wire 198. Also connected into the wire 197 is a wire 199 leading to the switch-arm 123. Connected into the last-mentioned wire 199 is a short wire 200 leading to the switch-arm 120.

The contact 192 adjacent the armature 153 is connected by means of a wire 201 to the signal-lamp 149.

Leading from the switch-arm 118 to the signal-lamp 146 is a wire 202. The companion signal-lamp 147 is connected by means of a wire 203 to the switch-arm 121.

*Operation*

The control-mechanism 100 will, under certain conditions, effect the steady energization of the signal-lamps 145 and 148, while the remaining signal-lamps 146, 147 and 149 remain unenergized. On other occasions, the signal-lamp 149 will receive steady energization in conjunction with the automatic sequential energization of the signal-lamps 145, 146, 147 and 148 at frequencies which vary inversely with respect to the forward speed of the vehicle. In other words, the rate of repeating cycles of sequential energization of the signal-lamps 145 to 148 inclusive will progressively increase with a progressive decrease in the speed of the vehicle and vice versa.

For purposes of making clear the operation of the signaling system illustrated in Figs. 3 and 4, it may be assumed that the instrumentalities are in the positions in which they are illustrated in Fig. 3 with the exception that the switch-blade 159 is in engagement with the contact 157 and that the contact-operating plate 133, detent-lever 137, actuating-lever 125 and flexible switch-arm 142 are in the positions in which they are indicated by broken lines in Fig. 3. It is to be still further assumed that the vehicle is moving forwardly at a speed above the critical speed of 45 miles per hour or such other critical speed as may have been predetermined.

Under the conditions above referred to, the drive-gear 15 of the control-mechanism 100 will be driven by the vehicle in the direction indicated by the arrow in Fig. 4, and hence under the circumstances at a greater rate of speed than the electric motor 25 is at the time turning the drive-gear 16 in the opposite direction. Therefore, the driven-gear 14 will actually bodily move in the same direction as the drive-gear 15 and will correspondingly turn the control-shaft 11.

The described turning movement of the control-shaft 11 in a counterclockwise direction (as viewed in Fig. 3) will similarly turn the control-cam 101, which latter will keep moving its cam-lugs 102 past the adjacent end of the actuating-lever 125 without in any way affecting the contact-operating plate 133 nor the elements shifted thereby.

During the described counterclockwise turning movement of the control-shaft 11 and the control-cam 101, the ratchet-wheel 105 will idly ride beneath the pawl 106 without effecting the rotation of the eccentric-operating disc 104, with the result that the contact-actuating lever 109 will not be moved from the position in which it is shown in Fig. 3.

Let it now be assumed that the operator of the vehicle desires to slow the vehicle down and for this purpose depresses the brake-pedal 166 and relieves the accelerator-pedal 182 of downward pressure. The downward pressure upon the brake-pedal 166 will permit the switch-arm 165 to engage with its complemental contact 167 to complete the circuit therethrough. Under these conditions, the electromagnet 156 will be energized to thereby attract both of its armatures 155 and 164. The downward movement of the armature 155 will engage the same with the contact 154, thereby completing the circuit through both of the contacts 189 and 190. It may be here noted that the electromagnet 151 will under these conditions, not be energized inasmuch as the flexible switch-arm 142 of the control-mechanism 100 is at this time out of electrical engagement with the switch-arm 143.

Under the circumstances just described, the engagement of the armature 153 with the contacts 189 and 190 will cause both of the signal-lamps 145 and 148 to be steadily energized until the speed of the vehicle falls slightly below the predetermined critical speed of 45 M. P. H.

As soon as the vehicle speed falls slightly below the predetermined critical speed as just above referred to, the drive-gear 16 will be turning at a speed slightly greater than the speed of the vehicle-driven drive-gear 15. This greater speed will result in bodily moving the driven-gear 14 in the same direction as the drive-gear 16, thus causing the control-shaft 11 to turn in a clockwise direction. This clockwise turning movement of the control-shaft 11 will similarly turn the control-cam 101 and the eccentric-operating disc 104.

The described clockwise turning movement of the control-cam 101 will turn the actuating-lever 125 in a counterclockwise direction from the position in which it is shown by broken lines in Fig. 3 into the position in which it is shown in full lines in the same figure. The counterclockwise turning movement of the actuating-lever 125 will, in turn, impart a clockwise movement to the contact-operating plate 133, thus turning the same from the position in which it is shown by broken lines in Fig. 3 into the position in which it is shown by full lines in the same figure. The clockwise turning movement of the plate 133 will cause the reverse movement of the detent-lever 137 in a counterclockwise direction from the position in which it is indicated by broken lines in Fig. 3 into the position in which it is shown by full lines in Fig. 3.

As the contact-operating plate 133 and the detent-lever 137 are turned coincidentally, as above described, the respective opposite ends of the detent-spring 138 will be positively moved from right to left past dead-center, i. e., past a line extending vertically between the respective axes of the two said elements 133 and 137.

As soon as the respective opposite ends of the detent-spring 138 are moved past dead-center, the said detent-spring 138 will act to snap the elements fully over into the positions in which they are shown by full lines in Fig. 3, thereby flexing the switch-arm 142 into electrical engagement with the switch-arm 143. The said elements will remain in the positions in which they are shown in Fig. 3 until such time as the control-cam 101 is turned in an opposite direction to shift the said elements back into the positions in which they are indicated by broken lines in Fig. 3.

The electrical engagement between the switch-arm 142 and 143 will serve to energize the electromagnet 151, thereby causing the same to lift its armature 153 out of engagement with the contacts 189 and 190 and into coincidental engagement with the contacts 191 and 192.

The disengagement of the armature 153 from the contacts 189 and 190 will de-energize the signal-lamps 145 and 148 and will remain so until again energized in a manner as will hereinafter be described.

Substantially coincidentally with the turning of the actuating-lever 125 as above described, the eccentric-operating disc 104 will, through the intermediary of the link 108, lift the contact-actuating lever 109 from the position in which it is shown by full lines in Fig. 3 into the position indicated by the upper broken lines in the same figure. In moving as just described, the roller 110 of the contact-actuating lever 109 will first engage with the lug 112 to flex the switch-arm 117 into electrical engagement with the switch-arm 118, thereby energizing the signal-lamp 146 for a time interval of relatively long duration. The roller 110 will pass upwardly out of engagement with the lug 112 and will ultimately reach a position in engagement with the lug 113, thereby flexing the switch-arm 115 into electrical engagement with the switch-arm 116, thereby energizing the signal-lamp 145.

After engaging with the lug 111, the roller 110 will be reversed in direction by the action of the eccentric-stud 107 and will start to move from the position in which it is indicated by the upper broken lines in Fig. 3 into the position in which it is indicated by the lower broken lines in the same figure.

In moving as above described, the roller 110 will sequentially engage the lugs 112, 113 and 114 to sequentially energize the signal-lamps 146, 147 and 148 for relatively long periods. The roller 110 will now reverse its direction and energize the signal-lamps just referred to in the reverse order.

Thus, by the action of the roller 110 as above described, the series of four signal-lamps 145, 146, 147 and 148 will be energized one after the other in the order named and then again energized in the reverse order from that named.

During the period of time that the signal-lamps 145 to 148 inclusive are being sequentially energized, as above described, the signal-lamp 149 will be steadily energized, due to the engagement of the armature 153 with the contact 192 during all of this period.

As the vehicle continues to slow down, the cycles of sequential energization of the signal-lamps 145, 146, 147 and 148 will occur proportionately more rapidly.

Now as the vehicle is brought to a stop, the drive-gear 15 will also come to a stop, while the complemental drive-gear 16 continues to rotate at its predetermined constant speed under the drive of the electric motor 25. Thus, the drive-gear 16 will be rotating rapidly relative to the now-stationary bevel-gear 15, with the result that the driven-gear 14 will bodily move about the control-shaft 11 at a relatively rapid rate and thus similarly rotate the said control-shaft 11 and the eccentric-operating disc 104 to continue to cause the sequential energization of the signal-lamps 145 to 148 inclusive at near-maximum frequency.

Despite the change in the rapidity of the cycles of sequential energization of the signal-lamps 145 to 148 inclusive, the signal-lamp 149 will remain steadily energized.

Now in the normal course of events, the operator of the vehicle will relieve the brake-pedal 166 of pressure, thus permitting the same to swing upwardly and cause the switch-arm 165 to move out of engagement with the contact 167. This breaking of the circuit at the point just described will not, however, deprive the circuit of energy, since at this time the locking armature 164 will be still held in engagement with the contact 178 until such time as the accelerator-pedal 182 is depressed, as will presently be described.

Thus, while the vehicle is at rest and despite the fact that the brake-pedal 166 is no longer being depressed, the sequential energization of the signal-lamps 145 to 148 inclusive and the steady energization of the signal-lamp 149 will continue.

After having been brought to a stop and should it be desired to cause the vehicle to reverse, the operator would normally depress the accelerator-pedal 182, thereby causing the switch-arm 181 to disengage from the contact 180, thereby depriving the signaling system of current via this portion of the circuit, though the operator would ordinarily maintain the circuit energized by closing the pushbutton switch 174.

With the signaling system still supplied with energy and with the vehicle moving in reverse, as above described, the frequency of the cycles of sequential energization of the signal-lamps 145 to 148 inclusive will increase in rapidity beyond any rate previously described, while the signal-lamp 149 will still remain steadily energized.

The pushbutton switch 174 may be utilized at any stage of the operation of the vehicle to energize the signaling system independently of the position of the brake-operated switch-arm 165, and the accelerator-operated switch-arm 181. It may be explained in this connection, however, that should the pushbutton switch 174 be closed while the accelerator-pedal 182 is free of foot pressure, the locking armature 164 will maintain the signaling system energized, despite the release of the pushbutton switch 174, until such time as the accelerator-pedal 182 is depressed.

Any rapid deceleration of the vehicle will cause the mercury switch 176 or its equivalent, to function to energize the signaling system and thus cause the operation of the same independently of the brake-operated switch-arm 165 and the accelerator-operated switch-arm 181. Thus, the mercury switch 176 under conditions just described, will perform in the same manner as that described for the push-button switch 174.

*The apparatus of Figs. 5 and 6*

In Figs. 5 and 6 is illustrated a modified form of signal-control mechanism to replace the bevel driven-gear 14 and the bevel drive-gears 15 and 16.

In Figs. 5 and 6, the control-shaft 11 has rigidly mounted on its central portion a double-armed gear-carrier 210 respectively carrying at its diametrically-opposite extremities, a pair of pinion-like driven-gears 211—211. Meshing into the inner portion of the driven-gears 211—211 is a drive-gear 212 having a hub 213 and together therewith mounted upon the control-shaft 11 with capacity for rotation with respect to the said control-shaft. The hub 213 has its periphery cut to provide a worm-wheel 214 into which may be meshed a motor-driven worm such as 23 particularly well shown in Figs. 2 and 4.

Meshing into the outer portions of the driven-gears 211—211 is a second drive-gear 215 having internal teeth as shown. The said drive-gear 215 is provided with a hub 216 and together therewith is mounted upon the control-shaft 11 with freedom for rotation with respect thereto. The periphery of the hub 216 is cut to provide a worm-wheel 217 into which may be meshed a vehicle-driven worm such as 19 in a manner corresponding to that shown particularly well in Figs. 2 and 4.

The control-shaft 11 may have attached thereto either the control-cam 26 of Figs. 1 and 2 or the elements 101 to 108 inclusive as illustrated in Figs. 3 and 4, or such other translating mechanism, as may be desired.

With the drive-gears 212 and 215 turned in opposite directions (one by a constant-speed motor such as 25, and the other by the vehicle), the driven-gears 211—211 will have their respective axes remain stationary as long as the respective peripheral speeds of the drive-gears 212 and the drive-gear 215 correspond.

As soon, however, as a variation in the respective peripheral speeds of the drive-gears 212 and 215 occurs, the gear-carrier 210 and hence, also, the control-shaft 11 will be turned in a manner corresponding to that previously described in connection with the movements of the collars 12 and 13.

For purposes of clarity of description, each of the elements 14, 15, 16, 211, 212 and 215 or their equivalents, has been referred to as a "gear" since each is provided with actual gear-teeth as is preferred. It is to be understood, however, that the use herein and in the accompanying claims, of the said term "gear" is intended to include toothless members or elements which have only frictional engagement.

From the foregoing it will be seen that by employing a differential mechanism like that provided by the driven-gear 14, drive-gears 15 and 16, or by the driven-gears 211—211 and drive-gears 212 and 215, it is possible to provide a vehicle with an automatic signaling system which produces the signaling effects of outstanding contrasts above described. Among the various signaling effects is to be particularly noted the fact that the rate of the intermittent signal produced is in inverse proportion to the forward speed of the vehicle, thus providing an extraneous observer with signal indications of a character which becomes more conspicuous as conditions require more cautious conduct on the part of extraneous observers.

It will further be noted that by means of the interaction of the elements 14, 15 and 16 of the control-mechanisms 10 or 100, or by the interaction of the elements 211, 212 and 215, not only is it possible to produce the intermittent signals just above referred to, but to also produce the variety of signals above described to indicate speeds above or below a critical speed and also to indicate the slowing-down of the vehicle, without requiring a complex and expensive mechanish to achieve these various results.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An automatic signal-mechanism for automobiles and other vehicles, including in combination: differential-mechanism comprising a first drive gear-unit, a second drive gear-unit and a driven gear-unit interconnecting the other two gear-units; connecting-means for connecting the said first drive gear-unit to the running-gear of a vehicle for being driven by the latter; substantially-constant-speed drive-means independent of the running speed of the vehicle and connected to the said second drive gear-unit to cause the latter to urge the driven gear-unit in a direction opposite to which the same is urged by the first drive gear-unit when the vehicle is moving forwardly; and translating-means operatively interposed between the said signal-means and the said driven gear-unit and constructed and arranged to cause the operation of the said signal-means when the latter gear-unit is moved in one direction by differences in relative speed between the other two gear-units and to idle without causing the operation of the said signal-means when the said driven gear-unit is moved in the other direction.

2. An automatic signal-mechanism for automobiles and other vehicles, including in combination: differential-mechanism comprising a first drive gear-unit, a second drive gear-unit and a driven gear-unit interconnecting the other two said gear-units; connecting-means for connecting the said first drive gear-unit to the running-gear of a vehicle for being driven by the latter; substantially-constant-speed drive-means independent of the running speed of the vehicle and connected to the said second drive gear-unit to cause the latter to urge the driven gear-unit in a direction opposite to which the same is urged by the first drive gear-unit when the vehicle is moving forwardly; a control-unit having actuating-lug means and operatively associated with the said driven gear-unit to be moved in opposite directions thereby as the last-mentioned gear-unit is moved by differences in relative speed between the other two gear-units; signal-actuating means associated with the said control-unit and including a signal-operating member and an actuating-member operatively associated with the said signal-operating member and having a portion engageable by the actuating-lug means of the said control-unit, the said actuating-member being constructed and arranged to shift the said signal-operating member when moved in one direction by the said actuating-lug means and to idly move with respect to the said signal-operating member when the actuating-member is moved in the opposite direction by a reverse movement of the said actuating-lug means; and signal-means operated by the said signal-operating member.

3. An automatic signal-mechanism for automobiles and other vehicles, including in combination: differential-mechanism comprising a first drive gear-unit, a second drive gear-unit and a driven gear-unit interconnecting the other two said gear-units; connecting-means for connecting the said first drive gear-unit to the running-gear of a vehicle for being driven by the latter; substantially-constant-speed drive-means independent of the running speed of the vehicle and connected to the said second drive gear-unit to cause the latter to urge the driven gear-unit in a direction opposite to which the same is urged by the first drive gear-unit when the vehicle is moving forwardly; a control-unit having actuating-lug means and operatively associated with the said driven gear-unit to be moved in opposite directions thereby as the last-mentioned gear-unit is moved by differences in relative speed between the other two gear-units; signal-actuating means associated with the said control-unit and including a switch-member and an actuating-member operatively associated with the said switch-member and having a portion engageable by the actuating-lug means of the said control-unit, the said actuating-member being constructed and arranged to shift the said switch-member when moved in one direction by the said actuating-lug means and to idly move with respect to the said switch-member when the actuating-member is moved in the opposite direction by a reverse movement of the said actuating-lug means; and an electric signal controlled by the said switch-member.

4. An automatic signal-mechanism for automobiles and other vehicles, including in combination: differential-mechanism comprising a first drive gear-unit, a second drive gear-unit and a driven gear-unit interconnecting the other two said gear-units; connecting-means for connecting the said first drive gear-unit to the running-gear of a vehicle for being driven by the latter; substantially-constant-speed drive-means independent of the running speed of the vehicle and connected to the said second drive gear-unit to cause the latter to urge the driven gear-unit in a direction opposite to which the same is urged by the first drive gear-unit when the vehicle is moving forwardly; a control-unit having actuating-lug means and operatively associated with the said driven gear-unit to be moved in opposite directions thereby as the last-mentioned gear-unit is moved by differences in relative speed between the other two gear-units; first signal-actuating means associated with the said control-unit and including a signal-operating member and a complemental actuating-member operatively associated with the said signal-operating member and having a portion engageable by the actuating-lug means of the said control-unit, the said actuating-member being constructed and arranged to shift its said complemental signal-operating member when moved in one direction by the said actuating-lug means and to idly move with respect to the said signal-operating member when the actuating-member is moved in the opposite direction by a reverse movement of the said actuating-lug means; second signal-actuating means also associated with the said control-unit and including a signal-operating member and a complemental actuating-member operatively associated with the said signal-operating member and having a portion engageable by the actuating-lug means of the said control-unit, the said actuating-member being constructed and arranged to shift its said complemental signal-operating member when moved in one direction by the said actuating-lug means and to idly move with respect to its complemental signal-operating member when the actuating-member is moved in the opposite direction by a reverse movement of the said actuating-lug means; the respective idle movements of the two actuating-members being in response to the respective opposite movements of the said actuating-lug means.

5. An automatic signal-mechanism for automobiles and other vehicles, including in combination: differential-mechanism comprising a first drive gear-unit, a second drive gear-unit and a driven gear-unit interconnecting the other two said gear-units; connecting-means for connecting the said first drive gear-unit to the running-gear of a vehicle for being driven by the latter; substantially-constant-speed drive-means independent of the running speed of the vehicle and connected to the said second drive gear-unit to cause the latter to urge the driven gear-unit in a direction opposite to which the same is urged by the first drive gear-unit when the vehicle is moving forwardly; a control-unit having actuating-lug means and operatively associated with the said driven gear-unit to be moved in opposite directions thereby as the last-mentioned gear-unit is moved by differences in relative speed between the other two gear-units; first signal-actuating means associated with the said control-unit and including a switch-member and a complemental actuating-member operatively associated with the said switch-member and having a portion engageable by the actuating-lug means of the said control-unit, the said actuating-member being constructed and arranged to shift its said complemental switch-member when moved in one direction by the said actuating-lug means and to idly move with respect to the said switch-member when the actuating-member is moved in the opposite direction by a reverse movement of the said actuating-lug means; second signal-actuating means also associated with the said control-unit and including a switch-member and a complemental actuating-member operatively associated with the said switch-member and having a portion engageable by the actuating-lug means of the said control-unit, the said actuating-member being constructed and arranged to shift its said complemental switch-member when moved in one direction by the said actuating-lug means and to idly move with respect to its complemental switch-member when the actuating-member is moved in the opposite direction by a reverse movement of the said actuating-lug means; the respective idle movements of the two actuating-members being in response to the respective opposite movements of the said actuating-lug means.

6. An automatic signal-mechanism for automobiles and other vehicles, including in combination: differential-mechanism which includes a first drive gear-unit, a second drive gear-unit and a driven gear-unit with one of the said gear-units interconnecting the other two of said gear-units; the three said gear-units being constructed and arranged to cause the two said drive gear-units to respectively urge the said driven gear-unit in opposite directions and to cause the said driven gear-unit to move in one direction when the effective driving-speed of the said first drive gear-unit exceeds the effective driving-speed of the said second drive gear-unit and to cause the said driven gear-unit to move in the opposite direction when the effective driving-speed of the second drive gear-unit exceeds the effective driving-speed of the first drive gear-unit; connecting-means for connecting one of the said drive gear-units to the running-gear of the vehicle for being driven thereby; substantially-constant-speed drive-means independent of the running speed of the vehicle and connected to the other of said drive gear-units to turn the same; signal-control means; one-way drive-means operatively interconnecting the said signal-control means with the said driven gear-unit and constructed and arranged to actuate the said signal-control means only when the driven gear-unit is moved in one direction and to idle when the driven gear-unit is moved in the opposite direction; and signal-means controlled by the said signal-control means.

7. An automatic signal-mechanism for automobiles and other vehicles, including in combination: a differential-mechanism which includes a first drive gear-unit, a second drive gear-unit and a driven gear-unit with one of the said gear-units interconnecting the other two of said gear-units; connecting-means connecting the said first drive gear-unit to the running-gear of a vehicle for being driven thereby; substantially-constant-speed drive-means independent of the running speed of the vehicle and connected to the said second drive gear-unit to cause the latter to urge the said driven gear-unit in a direction opposite to which the same is urged by the said first drive gear-unit when the vehicle is moving forwardly; signal-means; and translating-means operatively interposed between the said signal-means and the said driven gear-unit.

8. An automatic signal-mechanism for automobiles and other vehicles, including in combination: a differential-mechanism which includes a first drive gear-unit, a second drive gear-unit and a driven gear-unit with one of the said gear-units interconnecting the other two of said gear-units; connecting-means connecting the said first drive gear-unit to the running-gear of a vehicle for being driven thereby; substantially-constant-speed drive-means independent of the running speed of the vehicle and connected to the said second drive gear-unit to cause the latter to urge said driven gear-unit in a direction opposite to which the same is urged by the said first drive gear-unit when the vehicle is moving forwardly; signal-means; and translating-means operatively interposed between the said signal-means and the said driven gear-unit and constructed and arranged to cause the operation of the said signal-means when the driven gear-unit is moved in one direction and to idle without causing the operation of the said signal-means when the said driven gear-unit is moved in the other direction.

9. An automatic signal-mechanism for automobiles and other vehicles, including in combination: a differential-mechanism comprising a first drive gear-unit, a second drive gear-unit and a driven gear-unit with one of the said gear-units interconnecting the other two said gear-units; connecting-means connecting the said first gear-unit to the running-gear of a vehicle for being driven by the latter; substantially-constant-speed drive-means independent of the running speed of the vehicle and connected to the said second drive gear-unit to cause the latter to urge the said driven gear-unit in a direction opposite to which the same is urged by the first drive gear-unit when the vehicle is moving forwardly; electrically-responsive signal-means; switch-means controlling the said signal-means; and translating-means operatively interposed between the said switch-means and the said driven gear-unit and constructed and arranged to maintain the said switch-means in its on-condition when the driven gear-unit is moved in one direction by differences in speed between the other two gear-units and to maintain the said switch-means in its off-condition when the said driven gear-unit is moved in the other direction.

10. An automatic signal-mechanism for automobiles and other vehicles, including in combination: differential-mechanism which includes a first drive gear-unit, a second drive gear-unit and a driven gear-unit with one of the said gear-units interconnecting the other two of said gear-units; the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; connecting-means for connecting one of the said drive gear-units to the running-gear of a vehicle for being driven thereby; substantially-constant-speed drive-means operating independently of the running speed of the vehicle and connected to the other of the said drive gear-units for driving the same; electrically-responsive signal-means; switch-means controlling the energization and deenergization of the said signal-means; and translating-means operatively associated with the said driven gear-unit and the said switch-means, the said translating-means being constructed and arranged to maintain the said switch-means in one position to energize the said signal-means when the said driven gear-unit is moved in one direction and to maintain the said switch-means in another position to deenergize the said signal-means when the said driven gear-unit is moved in the opposite direction.

11. An automatic signal-mechanism for automobiles and other vehicles, including in combination: differential-mechanism which includes a first drive gear-unit, a second drive gear-unit and a driven gear-unit with one of the said gear-units interconnecting the other two of said gear-units; the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; connecting-means for connecting one of the said drive gear-units to the running-gear of a vehicle for being driven thereby; substantially-constant-speed drive-means operating independently of the running speed of the vehicle and connected to the other of the said drive gear-units for driving the same; first signal-operating means; first translating-means operatively associated with the said driven gear-unit and the said first signal-operating means, the said first translating-means being constructed and arranged to effect the operation of the said first signal-operating means; second signal-operating means; second translating-means operatively associated with the said driven gear-unit and the said second signal-operating means, the said second translating-means being constructed and arranged to maintain the said second signal-operating means in one position when the said driven gear-unit is moved in one direction and to maintain the said second signal-operating means in another position when the said driven gear-unit is moved in the opposite direction; and signal-means operatively associated with and controlled jointly by the said first signal-operating means and the said second signal-operating means.

12. An automatic signal-mechanism for automobiles and other vehicles, including in combination: differential-mechanism which includes a first drive gear-unit, a second drive gear-unit and a driven gear-unit with one of the said gear-units interconnecting the other two of said gear-units; the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; connecting-means for connecting one of the said drive gear-units to the running-gear of a vehicle for being driven thereby; substantially-constant-speed drive-means operating independently of the running speed of the vehicle and connected to the other of the said drive gear-units for driving the same; first switch-means; first translating-means operatively associated with the said driven gear-unit and the said first switch-means, the said first translating-means being constructed and arranged to effect the operation of the said first switch-means; second switch-means; second translating-means operatively associated with the said driven gear-unit and the said second switch-means, the said second translating-means being constructed and arranged to maintain the said second switch-means in one position when the said driven gear-unit is moved in one direction and to maintain the said second switch-means in another position when the said driven gear-unit is moved in the opposite direction; and electrically-responsive signal-means operatively associated with and controlled jointly by the said first switch-means and the said second switch-means.

13. An automatic signal-mechanism for automobiles and other vehicles, including in combination: differential-mechanism which includes a first drive gear-unit, a second drive gear-unit and a driven gear-unit with one of the said gear-units interconnecting the other two of said gear-units; the three said gear-units being constructed and arranged to cause the two said drive gear-units to respectively urge the said driven gear-unit in opposite directions and to cause the said driven gear-unit to move in one direction when the effective driving speed of the said first drive gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; connecting-means for connecting one of the said drive gear-units to the running-gear of a vehicle for being driven thereby; substantially-constant-speed drive-means operating independently of the running speed of the vehicle and connected to the other of the said drive gear-units for driving the same; first switch-means; first translating-means operatively associated with the said driven gear-unit and the said first switch-means, the said first translating-means being constructed and arranged to effect the operation of the said first switch-means only when the said driven gear-unit is moved in one direction; second switch-means; second translating-means operatively associated with the said driven gear-unit and the said second switch-means, the said second translating-means being constructed and arranged to maintain the said second switch means in one position when the said driven gear-unit is moved in one direction and to maintain the said second switch-means in another position when the said driven gear-unit is moved in the opposite direction; and electrically-responsive signal-means operatively associated with and controlled jointly by the said first switch-means and the said second switch-means.

14. An automatic signal-mechanism for automobiles and other vehicles, including in combination: differential-mechanism which includes a first drive gear-unit, a second drive gear-unit and a driven gear-unit with one of the said gear-units interconnecting the other two of said gear-units; the three said gear-units being constructed and arranged to cause the two said drive gear-units to respectively urge the said driven gear-unit in opposite directions and to cause the said driven gear-unit to move in one direction when the effective driving speed of the said first gear-unit exceeds the effective driving speed of the said second drive gear-unit and to cause the said driven gear-unit to move in the opposite direction when the effective driving speed of the said second drive gear-unit exceeds the effective driving speed of the said first drive gear-unit; connecting-means for connecting one of the said drive gear-units to the running-gear of a vehicle for being driven thereby; substantially-constant-speed drive-means operating independently of the running speed of the vehicle and connected to the other of the said drive gear-units for driving the same; electrically-responsive signal-means; first switch-means, second switch-means and third switch-means; translating-means operatively associated with the said driven gear-unit and the said first switch-means, second switch-means and third switch-means, the said translating-means being constructed and arranged to effect repeating cycles of operation of the said first switch-means, the said translating-means also being constructed and arranged to effect repeating cycles of operation of the said second switch-means only when the said driven gear-unit is moved in one direction and to effect repeating cycles of operation of the said third switch-means only when the said driven gear-unit is moved in the opposite direction; fourth switch-means and fifth switch-means; an electromagnet operatively associated with the said fourth switch-means and fifth switch-means and controlling the operation thereof; an energizing circuit for the said eelctromagnet, the said energizing circuit being rendered effective to energize the said electromagnet by the operation of the said second switch-means; and a locking-circuit for the said electromagnet including the said third switch-means and the said fourth switch-means, the said locking-circuit being constructed and arranged to continue the energization of the said electromagnet subsequent to the initial energization thereof by the said energizing-circuit and independently of the operation of the said second switch-means; the energization of the said electromagnet in turn actuating the said fifth switch-means into its operative position thereby rendering effective the operation of the said first switch-means to provide repeating cycles of energization and deenergization of the said signal-means; the operation of the said third switch-means in turn effecting the deenergization of the said electromagnet which restores the said fifth switch-means to its inoperative position thereby rendering ineffective the operation of the said first switch-means to energize the said signal-means.

HENRY SPICER DAVIS.

REFERENCES CITED

The following references are of record in the file of this patent:

UNITED STATES PATENTS

| Number | Name | Date |
| --- | --- | --- |
| 706,554 | Hall | Aug. 12, 1902 |
| 1,851,498 | Doane | Mar. 29, 1932 |
| 2,030,246 | Davis | Feb. 11, 1936 |